Figure 1:
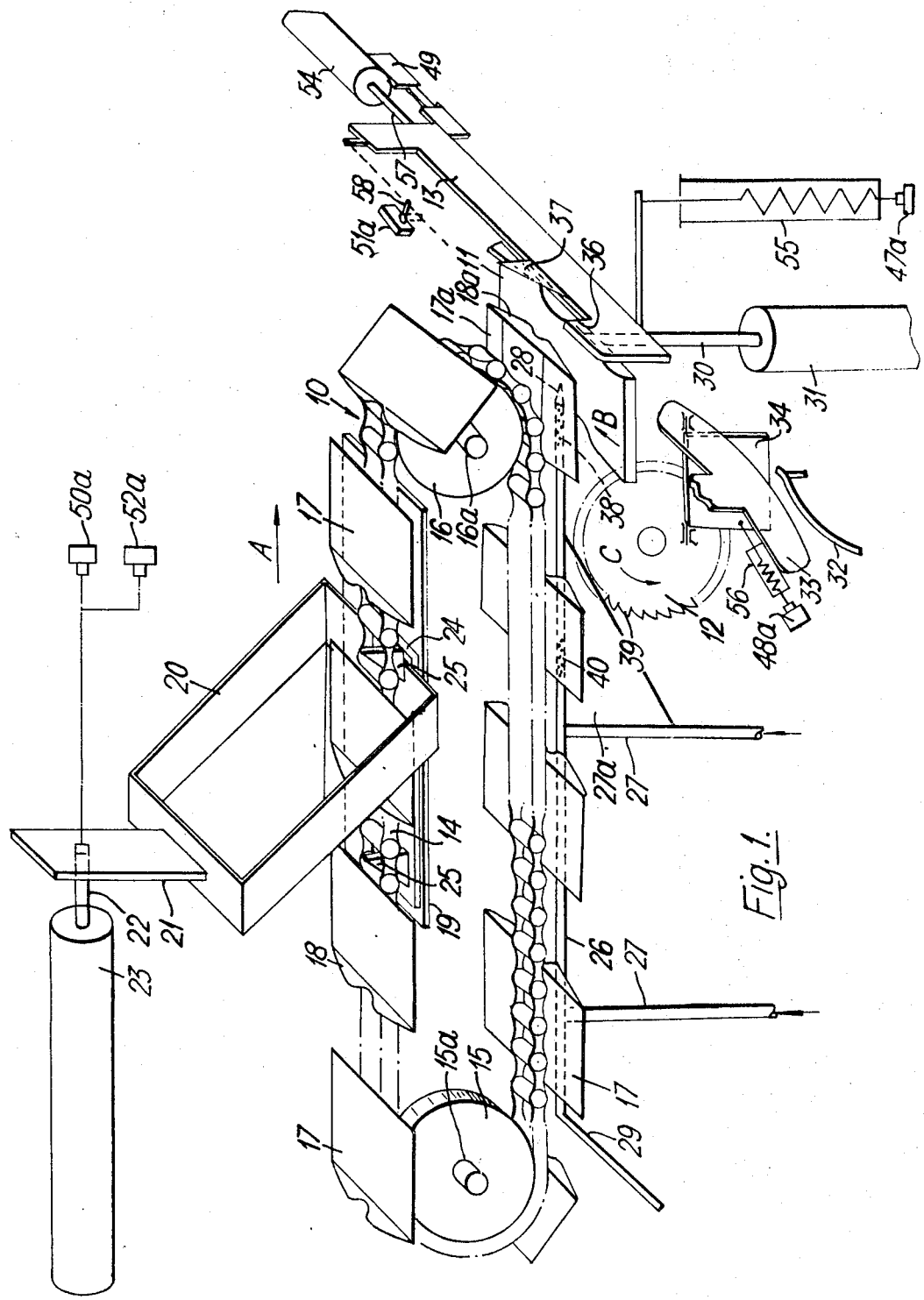

United States Patent

[11] 3,590,421

| [72] | Inventors | Peter Løth;<br>Kjeld Løth, both of Skovsgaard, Denmark |
|---|---|---|
| [21] | Appl. No. | 768,291 |
| [22] | Filed | Oct. 17, 1968 |
| [45] | Patented | July 6, 1971 |
| [73] | Assignee | Gordon Johnson-Stephens Limited<br>Gloucester, England |
| [32] | Priority | Nov. 9, 1967 |
| [33] | | Denmark |
| [31] | | 5597/67 |

[54] MACHINE AND METHOD FOR CLEANING AND CUTTING OPEN GIZZARDS OF SLAUGHTERED BIRDS
8 Claims, 6 Drawing Figs.

| [52] | U.S. Cl. | 17/11 R,<br>17/43 |
|---|---|---|
| [51] | Int. Cl. | A22c 17/14,<br>A22c 21/06 |
| [50] | Field of Search | 17/11, 43,<br>53, 72, 52 |

[56] References Cited
UNITED STATES PATENTS

| 2,455,675 | 12/1948 | Hawk | 17/53 |
| 2,695,418 | 11/1954 | Patterson et al. | 17/11 |
| 2,726,421 | 12/1955 | Strickler | 17/43 |
| 3,175,244 | 3/1965 | Sharp et al. | 17/11 X |

Primary Examiner—Lucie H. Laudenslager
Attorney—Larson, Taylor & Hinds

ABSTRACT: A machine for cleaning and cutting open the gizzards of slaughtered birds by first cleaning the gizzards by flushing them with a fluid under pressure, and then cutting them open.

A means for both supplying the fluid under pressure and for guiding the gizzards in a hollow feed pipe which skewers the gizzards. A feed conveyor for presenting them to the skewer has a conformation so that the orientation of the gizzards is correct. The feed pipe has a second set of outlets for the fluid so that the gizzards can be rinsed after cutting but while still guided by the feed pipe.

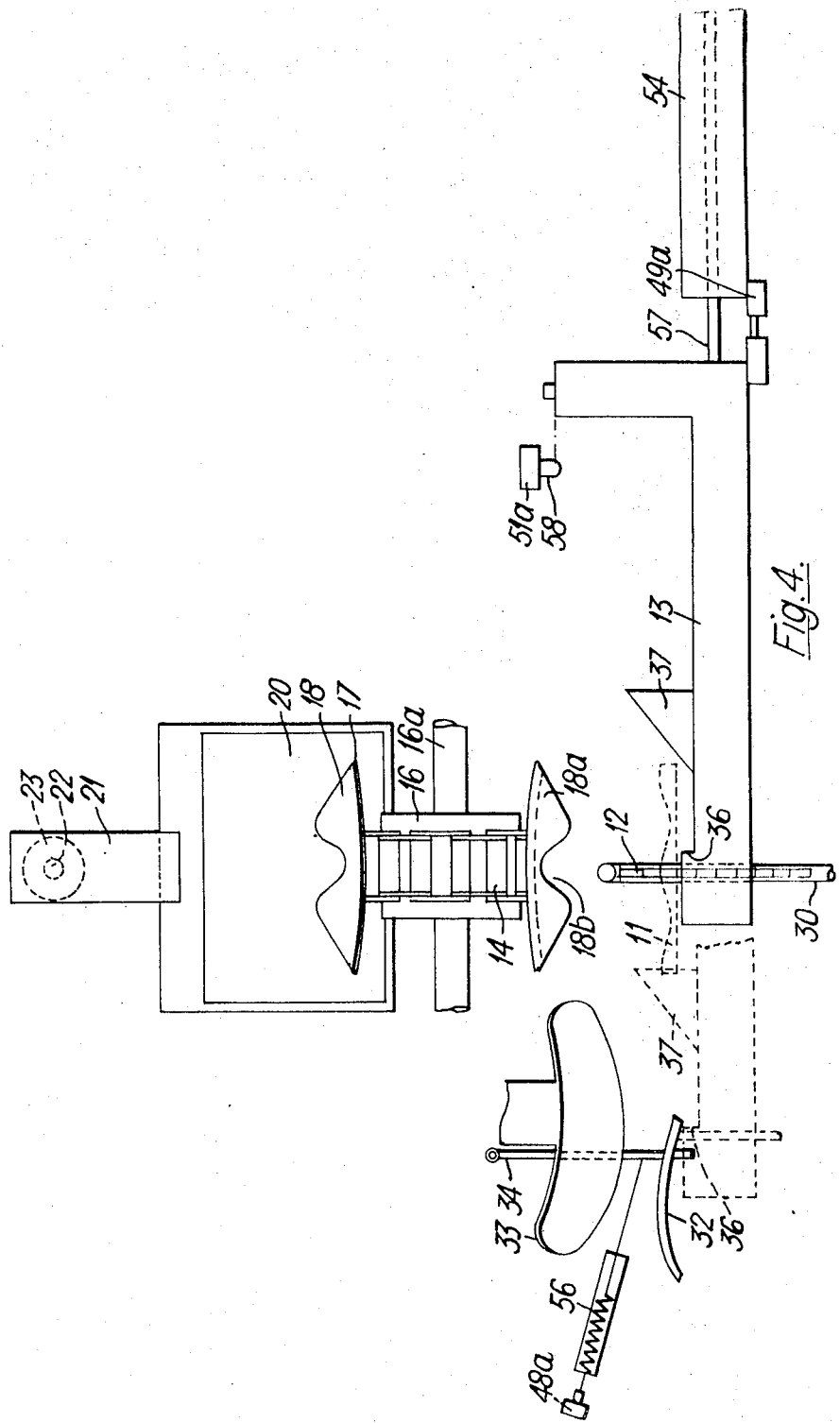

MACHINE AND METHOD FOR CLEANING AND CUTTING OPEN GIZZARDS OF SLAUGHTERED BIRDS

The invention relates to a machine for the cleaning and cutting open of the gizzards of slaughtered birds.

In the slaughtering of birds in poultry slaughterhouses, the most important inner organs, e.g. the gizzards, are separately processed and this is done by hand or one special machines.

The gizzards are cut open and cleaned and, if this is done by machine methods, a rotary knife is generally employed for the cutting open. This has the disadvantage that the knife rapidly becomes worn down, because, as it cuts through the wall of the gizzard, it penetrates into the interior of the gizzard which is filled inter alia with small stones and gravel.

The invention is based on the idea that it will be possible to obviate the disadvantage mentioned if stones and gravel to be removed from the cavity in the gizzard before the cutting-open step.

The operation of the machine is characterized in that there are directed from the interior of the gizzard towards the wall thereof jets of a pressure medium, preferably water, which is fed into the cavity in the gizzard through an aperture in the wall of the gizzard, and that only after this has taken place is the gizzard cut open. The said aperture may be a natural aperture or a perforation formed for that purpose.

In more detailed development of the method mentioned, the gizzard may be "skewered" on the feed pipe for the pressure medium, from which said pipe the pressure medium streams out into the gizzard cavity, and thereafter the gizzard is displaced along the feed pipe to a cutting-open position. The gizzard may, expediently, be cut open during this displacement. It is furthermore advantageous that the gizzard should, during or after continuing displacement along the tube in the cut-open condition, again be subjected to the action of jets of the pressure medium fed through the tube.

The machine according to the invention for the cleaning and cutting-open of the gizzards of slaughtered birds has means for progressively advancing the gizzards firstly to a position where means are provided for feeding a pressure medium to the cavity of the gizzards for cleaning the gizzards and subsequently to a position where a cutting member is provided, for cutting them open. It may include a tube which is closed and pointed at one of its ends and, in spaced relationship from that end, has jet apertures for a pressure medium fed through the tube, and that there is disposed with still greater spacing from the closed end of the tube a knife, the cutting edge of which is disposed closed to the surface of the tube. With this arrangement of the machine, the method under discussion may readily be adapted to be carried out by machine methods.

In order to achieve reliable and automatic guiding of the gizzards on the stationary tube, there may be arranged adjacent the latter an endless conveyor one run of which is disposed closely adjacent and along the tube and which carries equidistant plates having erect entrainment members, and adjacent the front end of the said run of the conveyor there may be a carrier plate which is adapted to be displaced towards and away from the conveyor and the purpose of which it is in its position remote from the conveyor, to receive a gizzard fed to it and, in its position nearer the conveyor, to press the gizzard against a plate on the conveyor.

The pointed end of the tube is best arranged immediately adjacent the carrier plate, the gizzard being retained by means of the said carrier plate on the conveyor plate during initial movement. In this way it becomes possible to directly transfer the gizzard for "skewering" on the tube. This is most successfully effected if the carrier plate is so smooth that the gizzard is readily able to slide along the plate.

In order to cause the gizzard to adopt the correct position on the carrier plate, taking into consideration the fact that it is to be possible to skewer the gizzard on the tube, it is, according to a further optional feature of the invention, important that the uppermost face, facing the gizzard, of the carrier plate, should have a special shape which is characterized by an undulating profile having a projecting part of the undulation at the center of the plate. In this way, there is provided at the center line of the carrier plate, a low, rounded rib which, when the gizzard is pressed between the carrier plate and the overlying plate on the conveyor, is pressed in between the two powerful muscles, disposed opposite each other, which the gizzard contains, the membrane located between the said muscles being simultaneously curved inwardly, so that one muscle passes into position along each side of the said rib. The fact that the gizzard is surrounded by a mucous film or membrane which is still moist directly after the bird has been slaughtered, contributes to this conformation of the gizzard.

Figure 2:
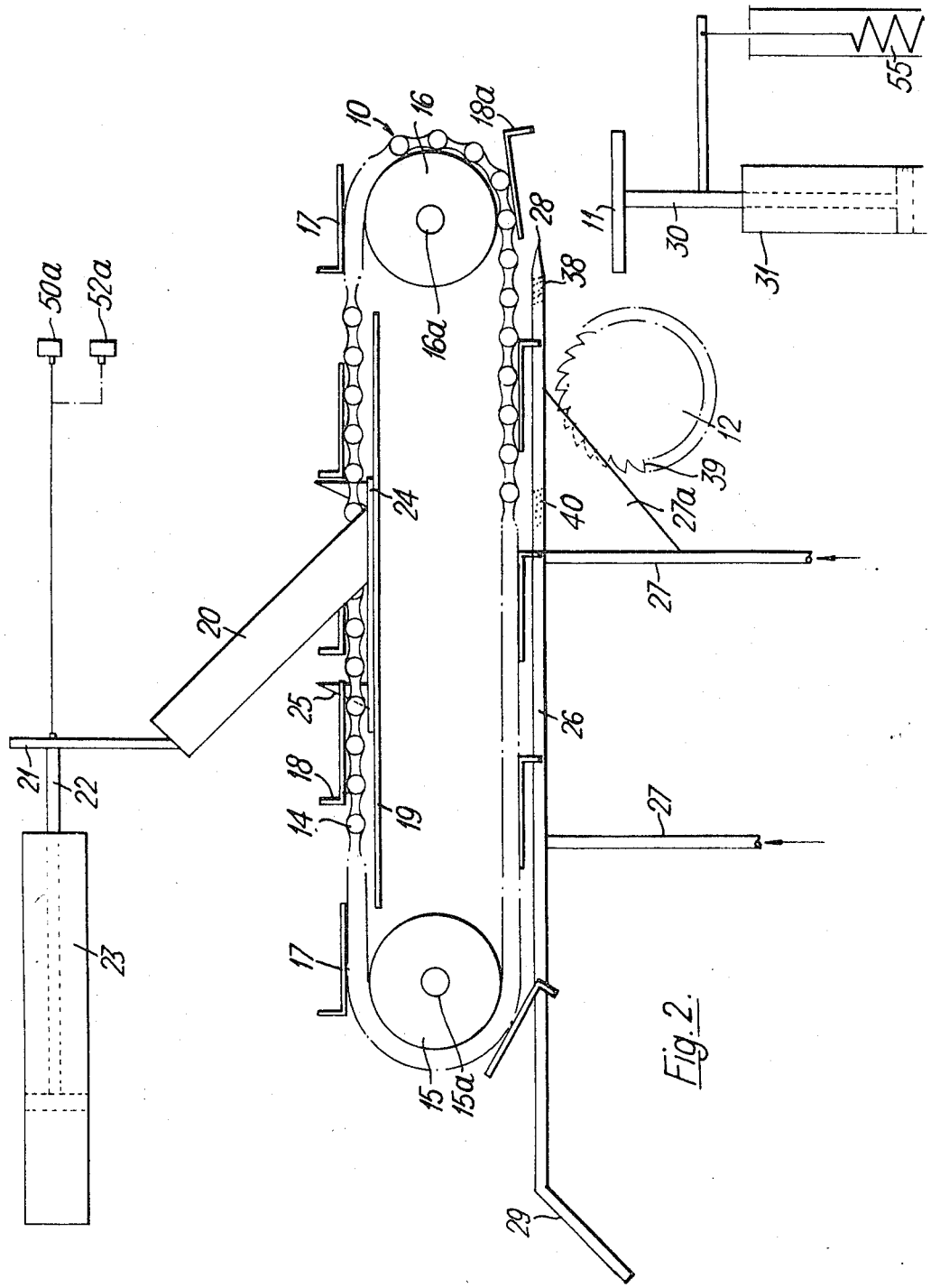
Figure 3:
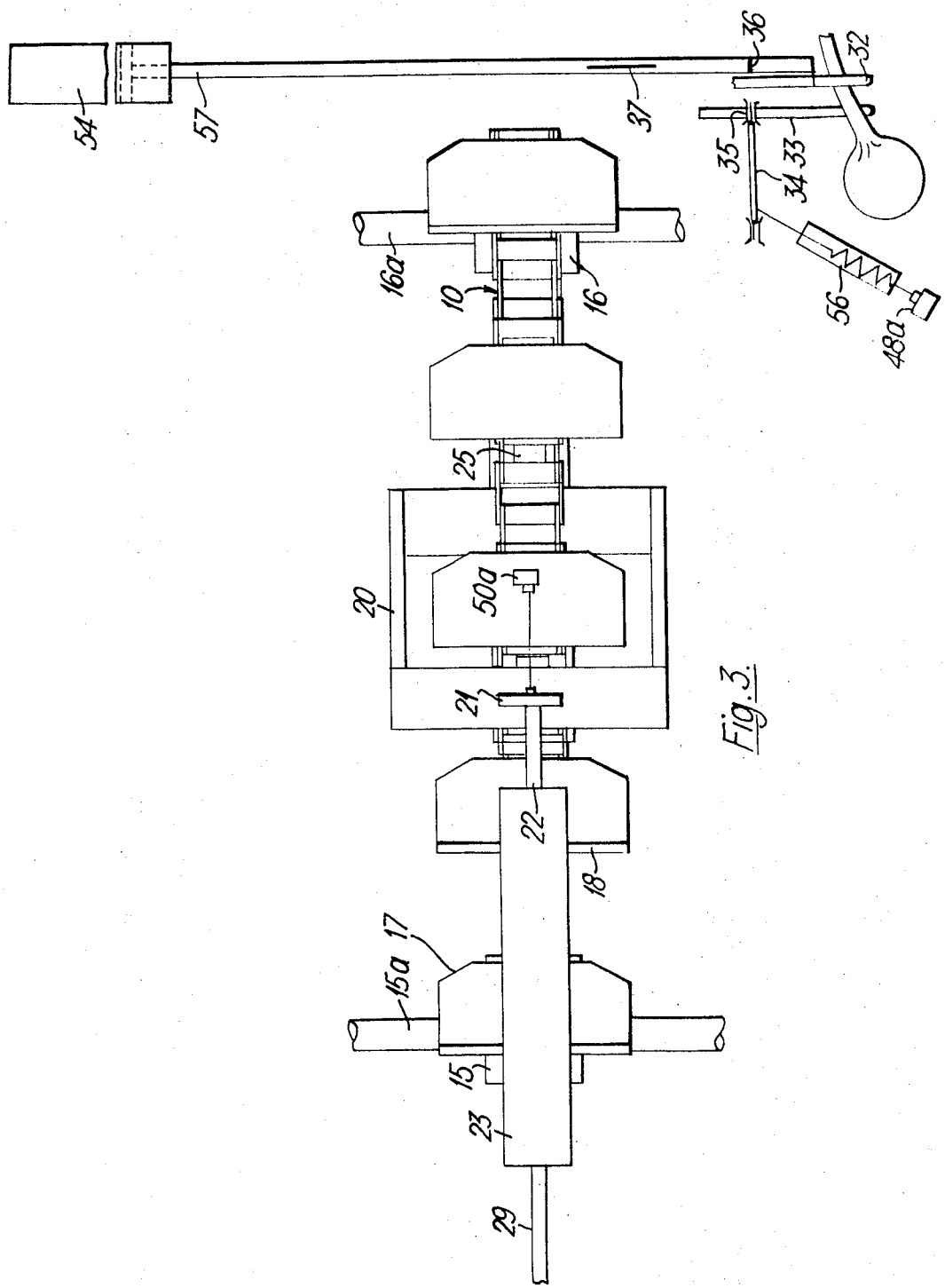
Figure 6:
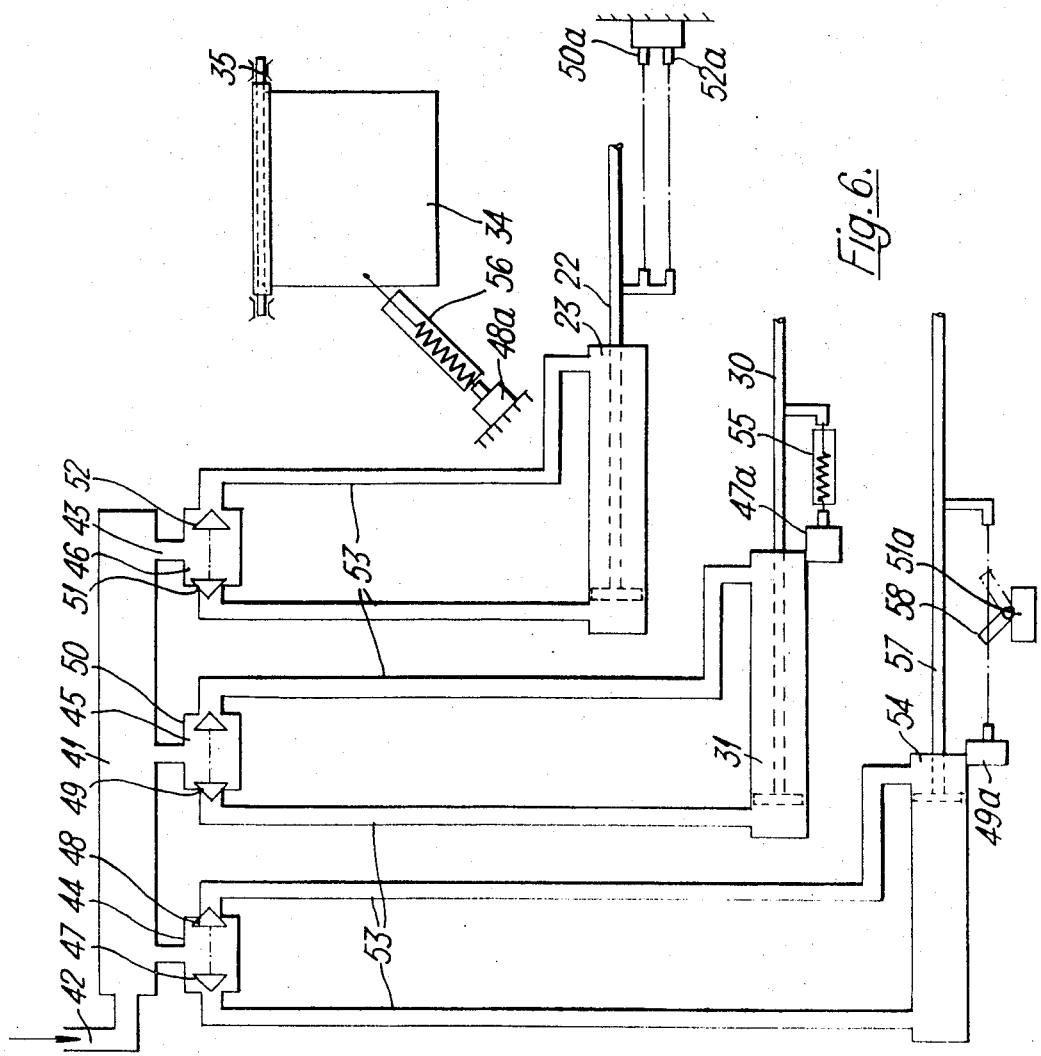
Figure 5:
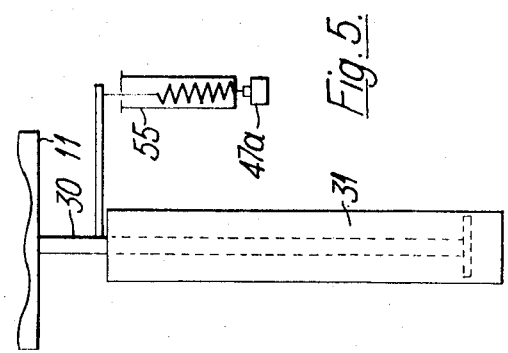

Further features of the machine under discussion will be disclosed by the following description of one form of embodiment of the machine, shown diagrammatically in the accompanying drawings, wherein:

FIG. 1 shows, in perspective, essential parts of the machine,
FIG. 2 shows the same, as seen from the side,
FIG. 3 shows the same, as seen from above,
FIG. 4 shows the same, as seen from in front,
FIG. 5 shows certain parts of the machine, again as seen from in front, and
FIG. 6 shows, diagrammatically, a compressed air arrangement by means of which the embodiment is driven, and also an oscillating plate by means of which the embodiment is started.

The machine illustrated has a conveyor 10, serving for the feeding of the gizzards to the various working positions and cooperating with a carrier plate 11 and a rotating knife 12, and a reciprocating member 13 consisting of a rod sliding in guideways (not shown) and the direction of working of which is at right angles to the plane of the conveyor. The said member serves for the conveying of gizzards introduced into the machine to the carrier plate 11.

The conveyor 10 consists of a roller chain 14 travelling over rollers 15 and 16 (shown diagrammatically). The spindles of the rollers are designated 15a and 16a respectively. Equidistantly arranged along the outer sides of the chain is a plurality of plates 17 the faces of which remote from the chain are slightly concave and which plates have at their rearmost edge and upwardly extending flange 18 serving for the entrainment of a gizzard disposed on its plate. Arranged under the uppermost run of the conveyor is a stationary plate 19 connected with the machine stand (not shown). The forward movement of the conveyor 10, during the use of the machine, is effected stepwise with the aid of a rectangular frame 20 having an upwardly extending part 21 fast on the end of a piston rod 22, the piston of which operates in a double acting compressed air cylinder 23, the embodiment illustrated thus being operated with the aid of compressed air. Secured underneath the frame 20 is a plate 24 which slides along the stationary plate 19 and which carries two upwardly extending, wedge-shaped latching projections 25 engaging between the links of the chain 14. When the frame is displaced forwardly in the direction of the arrow A during the forward movement of the piston in the cylinder 23, the projections 25 positively engage the chain 14 and convey forwardly therewith the plates 17. Each such movement is for a distance which is equal to the spacing between the center points of two consecutive plates 17. When the frame 20 is withdrawn in the opposite direction by the cylinder 23, the uppermost run of the chain 14 is pushed upwardly by the oblique faces of the projections 25 and these tips slide along the underside of the chain and, at the end of the reverse movement, again pass into engagement with the chain. In this way, the conveyor is periodically conveyed forward and with each conveying-forward a plate thereon is displaced to the position which has been occupied by the previous plate.

A jet tube 26 is supported stationary in the horizontal position by two vertical tubes 27 which also serve for the feeding of pressure medium, preferably pressure water, to the tube 26. The front end of the tube, which is seen on the right-hand side in FIGS. 1 and 2, is closed and is formed as a point 28, whereas the rear portion 29 of the tube is bent downwardly and is also closed at the end. The vertical tubes 27 may be secured to the machine frame. A reinforcing gusset 27a is formed by parallel, spaced apart triangular plates. The tube 26 is disposed closely below the plates 17, when they are on the lowermost run of the conveyor 10, and in order to provide room for the tube there are formed in the center of the flanges 18 recesses 18b the shape of which is best shown in FIG. 4.

When the conveyor is stationary one of the plates 17 (designated 17a) is disposed approximately vertically below the spindle of the foremost roller 16 and the carrier plate 11 is disposed vertically below the plate 17a. It can be displaced towards or away from the plate 17a, in that it is attached at the end of the piston rod 30 on a vertically disposed compressed air cylinder 31. When the carrier plate 11 is in its lowermost position, a gizzard is pushed in onto the plate in the direction of the arrow B in FIG. 1 and the gizzard thus introduced is, when the carrier plate 11 is raised, jammed between the latter and the plate 17a, compressed air being fed to the lowermost end of the cylinder 31.

DUring the introduction of the gizzard manually onto the carrier plate 11 along a slide plate (not shown), the gizzard is still attached to the bird from the body cavity of which it has been removed, by a "strand" formed by the windpipe and gullet of the bird. Simultaneously, the bird is conveyed forwardly, suspended from the head-conveying means of the poultry slaughterhouse, along the forward end of the machine, i.e. beside the reciprocating member 13 and parallel to it. The said "strand" passes, during the introduction of the gizzard, between a fixed, curved slide rod 32 and the lowermost, curved edge of a guide rail 33, which is also fixed. During the introduction of the gizzard onto the carrier plate, the gizzard or the operator's fingers impinge against a swinging plate 34 mounted above in bearings 35, the plate, which normally hangs vertical under the influence of its weight being thereby caused to adopt an oblique position, whereby the machine is started up, in a manner to be explained later. Thereupon, the plate 34 drops back into the vertical position.

When the machine is started up, the rod 13 is displaced forwardly (i.e. to the left in FIG. 4) whereby the above-mentioned "strand" on the gizzard passes in behind a hook or projection 36 at the front end of the rod 13. Directly thereafter, the rod 13 is displaced in the opposition direction, whereby the hook 36 catches the strand and presses the gizzard onto the lowered carrier plate 11 on which the gizzard takes up its position in a rearwardly slightly oblique position, because the force is supplied through the "strand." When the rod 13 is subsequently conveyed rearwardly so as to introduce a new gizzard into the machine, the "strand" of that gizzard which is positioned on the plate 11 is severed by a wedge-shaped knife 37 secured on the rod.

Before this severing takes place, the carrier plate 11, with the gizzard disposed thereto, is travelling upwardly and immediately following thereon the gizzard passes into the position clamped between the carrier plate and the plate 17a disposed thereabove on the conveyor 10.

The uppermost surface of the carrier plate which, for example, may be manufactured from curved sheets of stainless steel (since the said surface must be smooth) has a corrugated profile (as can be seen in particular in FIG. 5), so that there is a projecting part of the undulation at the center line on the plate, which is disposed in the central longitudinal plane of the conveyor 10. The surface of the plate has the shape of a portion of a cylinder surface produced by displacing a rectilinear generatrix along the said profile at tight angles thereto. As FIG. 5 shows, the undulation projections are slightly higher at the edges of the plate than the undulation projection at the center, and the two valleys of the undulations are equally deep.

Roughly speaking, a gizzard consists of strong muscles, disposed opposite each other, and joined above and below by membranes, by which means there is delimited a cavity which, in a fowl which has been slaughtered, contains small stones and gravel together with other impurities in the form of fibers and other indigestible small elements. The said membranes may be pressed inwardly, thus forming a groove along the underside of the gizzard. When the carrier plate 11 is lifted and the gizzard passes into the jammed position, the rib formed by the undulation projection at the center of the plate attempts to rotate the gizzard in a horizontal plane, since as this takes place the low, rounded rib formed by this projection is able to penetrate into the groove. The result of this is that the gizzard is arranged in such manner that its axis between the muscles passes into a position in the direction of the axis of the jet pipe 26, or, at best, the two axes coincide. This means that that end of the gizzard which is opposite the aperture formed during the severing of the "strand" of the gizzard is disposed directly opposite the point 28 of the tube.

After the jammed-in gizzard has been put in the position just described, the conveyor 10 is conveyed forwardly by the distance of one step. As this is done, the gizzard is entrained by the upwardly extending flange 18 on the plate 17a and slides at the same time out from the carrier plate 11, the gizzard being simultaneously "skewered" on the point 28 of the tube 26, whereby the point will frequently pass out through the aperture in the gizzard left behind by the "strand" of the gizzard. When the gizzard has, in this manner, passed on to the end of the tube 26, it passes through a zone wherein the tube has a group of fine apertures 38 through which there simultaneously radiate to all sides fine jets of pressure water from the tube 26. The said jets flush out the impurities contained in the gizzard, including all the small stones and gravel, which leave the cavity of the gizzard along the edges of the apertures formed in the gizzard as the latter is skewered on the tube and preferably through the above-mentioned aperture in the gizzard left behind by the "strand." During the further passage of the gizzard forwardly along the tube 26, the gizzard passes the knife 12 having the form of a disc rotating in the direction indicated by an arrow C and provided with saw teeth 39 along its periphery. The said teeth reach, above, almost entirely up to the surface of the tube 26 and will therefore cut through the downwardly facing membrane of the gizzard, which then opens. They enter between the parallel plates forming the gusset 21a, which thereby helps in opening the gizzard when cut.

In the machine shown and with the mode of operation described, the gizzard is first of all cut open by the knife 12 after the impurities in the gizzard have been removed so that the knife is not worn by stones and gravel. If the latter were to be present, frequent replacement of the knife would be necessary.

After the cutting-open of the gizzard, the latter is conveyed further, by sliding along the tube 26, always under the influence of the upstanding flange 18a on the plate 17a. As this takes place, the gizzard passes through a new zone having jet apertures 40 which suitably are provided only at the top of the tube 26. During the subsequent flushing, effected thereby, on the open gizzard, the plate 17a may be at a standstill or it may be travelling between two at rest positions.

The water, the pressure of which may for example be 6 atmospheres, may be fed continuously or intermittently, whilst the gizzards are conveyed forwardly or at rest between successive forward movements of the conveyor 10. In the latter case, the spacing between the two groups of apertures 38 and 40 should be equal to the spacing between successive plates 17 on the conveyor.

Finally, the gizzards slide downwardly along the the rearmost portion 29 of the tube 26 whereafter they may be conveyed further to some other processing machine, serving for example for the removal of the inner skin of the gizzard.

The knife 12 is kept in continuous rotation, being driven for example by an electric motor.

In the following text, a description is given of the compressed air arrangement, for driving the machine, diagrammatically shown in FIG. 6.

In a container 41, which is connected with a source of compressed air (not shown) by a feed pipe 42, a constant pressure is continuously maintained by automatic means. The container 41 is, at the branch pipe 43, connected with three valve housings 44, 45 and 46 adapted to be connected, via valve bodies 47 and 48, 49 and 50 and also 51 and 52 respectively, via the tube 53, with the rearmost and foremost ends of three compressed air cylinders, i.e. respectively a compressed air cylinder 54 for driving the member 13, the already-mentioned cylinder 31 for displacement of the carrier plates 11, and the already-mentioned cylinder 23 for the conveying-forward of the conveyor 10. The valve bodies are retained in their closed position by means of springs (not shown).

Each valve body 47—52 may be displaced into the open position by an associated influencing member which has been given the same reference numeral as the valve body with the addition of the letter a, in such manner that the valve-influencing members have been given the reference numerals 47a—52a (see in particular FIG. 6). These members are actuated by some of the moving parts of the machine, or by depression of a pin, or by the shifting of the position of a rocker arm, as shown diagrammatically, in particular, in the last-mentioned figure. The valve body 47 is thus acted upon by the piston rod 30 of the cylinder 31, this being indicated by showing the member 47 in the said figure also attached on the cylinder 31. The actuating member 48a of the valve body 48 (shown in FIG. 6) is shifted by the oscillation of the flap 34, as the gizzard is fed to the machine. Between the piston rod 30 and the member 47a and also between the flap 34 and the member 48a there is a certain degree of resilience in the reciprocal connection, this being indicated by pushing into it a helical spring 55 and 56 respectively which however can only be stretched to a predetermined limit as indicated by the surrounding tubular envelopes 55a and 56a respectively, whereupon force-transmission takes place. The influencing or actuating member 49a of the valve body 49 is acted upon by the piston rod 57 associated with the cylinder 54 and connecting the piston in the cylinder with the reciprocating member 13 (see FIG. 1). The influencing member 50a of the valve body 50 is acted upon by the piston rod 22 of the cylinder 23 and the same applies to the member 52a influencing the valve body 52. The influencing member 51a of the valve body 51 has, as shown, an oscillating arm 58 which is acted upon by the piston rod 57 during the movement thereof between the end position. The said arm is shown in full lines in FIG. 6, in that position wherein the valve is closed, whereas the dotted lines show the position wherein the valve is open.

The mode of operation during the working of the machine is as follows. As a gizzard is introduced into the machine, the flap 34 is pivoted inwardly, whereby the valve body 48 is opened due to actuation via the member 48a. In this way, compressed air is fed to the forward end of the cylinder 54, whereby the member 13, which originally is disposed in its foremost position, is conveyed rearwardly, the result of this being that the hook or projection 36 on this member presses the gizzard on to the carrier plate 11. During this movement, the arm 58 on the member 51a is shifted from the open to the closed position, so that the previously open valve body 51, which has brought about the forward conveying of the piston rod 22 and therewith of the conveyor 10, is closed. During the further movement of the piston rod 57, the influencing member 49a is impinged-on, so that the valve body 49 is opened and permits the passage of compressed air to the rearmost end of the cylinder 31. The piston rod 30 thereof, and therewith the carrier plate 11, are lifted and the gizzard is held fast between the said plate and the plate 17a disposed above it on the conveyor. During the upward movement of the piston rod 30, the member 47a is also acted-upon by a delayed action which opens the valve body 47 so that compressed air is fed to the rearmost end of the cylinder 54, the result of this being a backwardly travelling movement of the member 13 and the severing of the "strand" still adhering to the gizzard, whereby the gizzard and the bird are separated. A short time later, the arm 58 of the member 51a is shifted-over, with the result that the valve body 51 is opened and compressed air is fed to the rearmost end of the cylinder 23. The result of this is an outward movement of the piston rod 22 and therewith the conveying-forward of the conveyor 10 by the amount of one division. During this movement, the plate 17a presses the gizzard out from the carrier plate 11 and the gizzard is "skewered" (as already mentioned) on the point 28 of the jet pipe 26. Furthermore, the member 52a is acted-upon, the valve body 52 opened, compressed air is fed to the foremost end of the cylinder 23 and the piston rod 22 travels back, entraining the frame 20, whereby the wedge-shaped projections 25 travel rearwardly (as already stated) and are subsequently ready for a new conveying-forward movement of the conveyor 10. The machine has then carried out a working cycle and will be at a standstill until a new gizzard is introduced and the flap 34 is acted-upon thereby.

The invention is not restricted to the form of embodiment illustrated which is intended to serve merely as an example of the manner in which the machine may be constructed and caused to operate in accordance with the method disclosed by the invention, the scope of the invention (as far as the machine is concerned) being determined solely by the claims. The machine may be driven by means other than compressed air, for example by mechanical means, using relays and solenoids.

We claim:

1. Machine for cleaning and cutting open of the gizzards of slaughtered birds having a feed means, a washing medium supply member and a cutting member; the feed means including means for progressively advancing the gizzards to a first position and for impaling the gizzards on the washing medium supply member by virtue of movement imparted to the gizzards by the said feed means, said feed means further including means for then moving the gizzards along the supply member while impaled towards a second position, spaced from the said first position along the said supply member, the cutting member being disposed to act on the gizzards at the second position, and an outlet for washing medium in the said supply member between the said first position and the said second position, such that a gizzard is brought by the feed means first to be impaled on the supply member then to be washed from inside by washing medium issuing from the outlet and then to be cut open by the cutting member.

2. Machine according to claim 1, wherein the feed means is an endless conveyor, one run of which conveyor is disposed close above said supply member for progressively advancing the gizzards along said supply member, and which conveyor carries plates equidistantly spaced along it, each plate having upstanding entrainment means, and there is disposed at the beginning of the said one run of the conveyor a carrier plate adapted to be displaced towards and away from the conveyor and which is intended, in its position further from the conveyor, to receive a gizzard and, in its position nearer the conveyor, to press the gizzard against a plate on the conveyor.

3. Machine according to claim 2 wherein the face of the carrier plate to come in contact with the gizzard is so shaped that the gizzard is, as it is pressed against the said face, caused to adapt to a predetermined desired position.

4. Machine according to claim 3 wherein the said face of the carrier plate has an undulating profile with an undulation projection in the center of the face.

5. Machine according to claim 2 wherein there is a mechanism for the stepwise indexing of the conveyor over a distance equal to the spacing between two successive plates on the conveyor and the cutting member is disposed between two at rest positions for successive plates on the conveyor.

6. Machine according to claim 2 wherein a reciprocating member is adapted to be displaced at right angles to the line of run of the conveyor and serving for feeding the gizzard from that direction to the carrier plate, when the latter is in its position further from the conveyor, the reciprocating member having a projection adapted, during a movement of the reciprocating member, to engage a "strand" of animal material which connects the gizzard with the bird, thereby drawing the gizzard on to the carrier plate.

7. Machine according to claim 6, wherein there is disposed on the reciprocating member a knife adapted to sever the animal "strand" during movement of the member.

8. Machine according to claim 1, wherein the feed means includes discrete entrainment integers for engaging behind and pushing on the gizzards and a movable platform movable from a position where a gizzard is received upon it to a position closely adjacent the said first position and where the platform presents the gizzard for entrainment by the entrainment integer and impalement on the said supply member.